US008675790B2

(12) United States Patent
Mayer et al.

(10) Patent No.: US 8,675,790 B2
(45) Date of Patent: Mar. 18, 2014

(54) ADAPTIVE DIGITAL SIGNAL PROCESSING OF A RECEIVE SIGNAL

(75) Inventors: Andreas Mayer, Linz (AT); Herwig Dietl, Wels (AT); Christian Mayer, Linz (AT); Gernot Hueber, Linz (AT); Christian Lederer, Rosenbach (AT); Hermann Hofer, Linz (AT); Guenther Haberpeuntner, Linz (AT); Burkhard Neurauter, Linz (AT)

(73) Assignee: Infineon Technologies AG, Neubiberg (DE)

( * ) Notice: Subject to any disclaimer, the term of this patent is extended or adjusted under 35 U.S.C. 154(b) by 381 days.

(21) Appl. No.: 12/873,295

(22) Filed: Aug. 31, 2010

(65) Prior Publication Data

US 2012/0051473 A1    Mar. 1, 2012

(51) Int. Cl.
*H03D 1/04* (2006.01)
(52) U.S. Cl.
USPC .......................................... 375/346; 375/316
(58) Field of Classification Search
USPC ......... 375/346, 295, 130, 148, 316, 349, 350; 341/143
See application file for complete search history.

(56) References Cited

U.S. PATENT DOCUMENTS

| 6,198,783 | B1 * | 3/2001 | Campana, Jr. | 375/346 |
| 6,834,073 | B1 * | 12/2004 | Miller et al. | 375/130 |
| 6,842,498 | B2 * | 1/2005 | Heinzl et al. | 375/350 |
| 7,477,710 | B2 * | 1/2009 | Narayan et al. | 375/349 |
| 7,787,569 | B2 * | 8/2010 | Hayem et al. | 375/316 |
| 2007/0230612 | A1 * | 10/2007 | Ahmed | 375/295 |
| 2010/0054310 | A1 * | 3/2010 | Yule et al. | 375/148 |

FOREIGN PATENT DOCUMENTS

WO    WO 2006046188    *    5/2006    ............ H04B 1/10

* cited by examiner

*Primary Examiner* — Daniel Washburn
*Assistant Examiner* — Fitwi Hailegiorgis
(74) *Attorney, Agent, or Firm* — SpryIP, LLC

(57) ABSTRACT

A receiver is provided with a digital signal processing circuit to process a receive signal. In addition, the receiver includes an interference detector to detect an interference scenario affecting reception of the signal by the receiver. Depending on the interference scenario detected by the interference detector, the digital signal processing circuit is adapted.

13 Claims, 5 Drawing Sheets

ADAPTIVE DIGITAL SIGNAL PROCESSING OF A RECEIVE SIGNAL

FIELD OF THE INVENTION

The present invention relates to circuits and methods for adaptive digital signal processing of a receive signal.

BACKGROUND OF THE INVENTION

In receivers, it is known to use processing circuitry offering high performance to process received signals. In this way, it becomes possible to successfully receive signals even under unfavorable conditions. On the other hand, low power consumption of receivers is desired. For example, a low power consumption of a receiver in a mobile communication device may offer an extended battery life.

Accordingly, there is a need for techniques which allow for power efficient processing of receive signals, without degrading a receivers ability to receive signals under unfavorable conditions.

DETAILED DESCRIPTION

Figure 1:
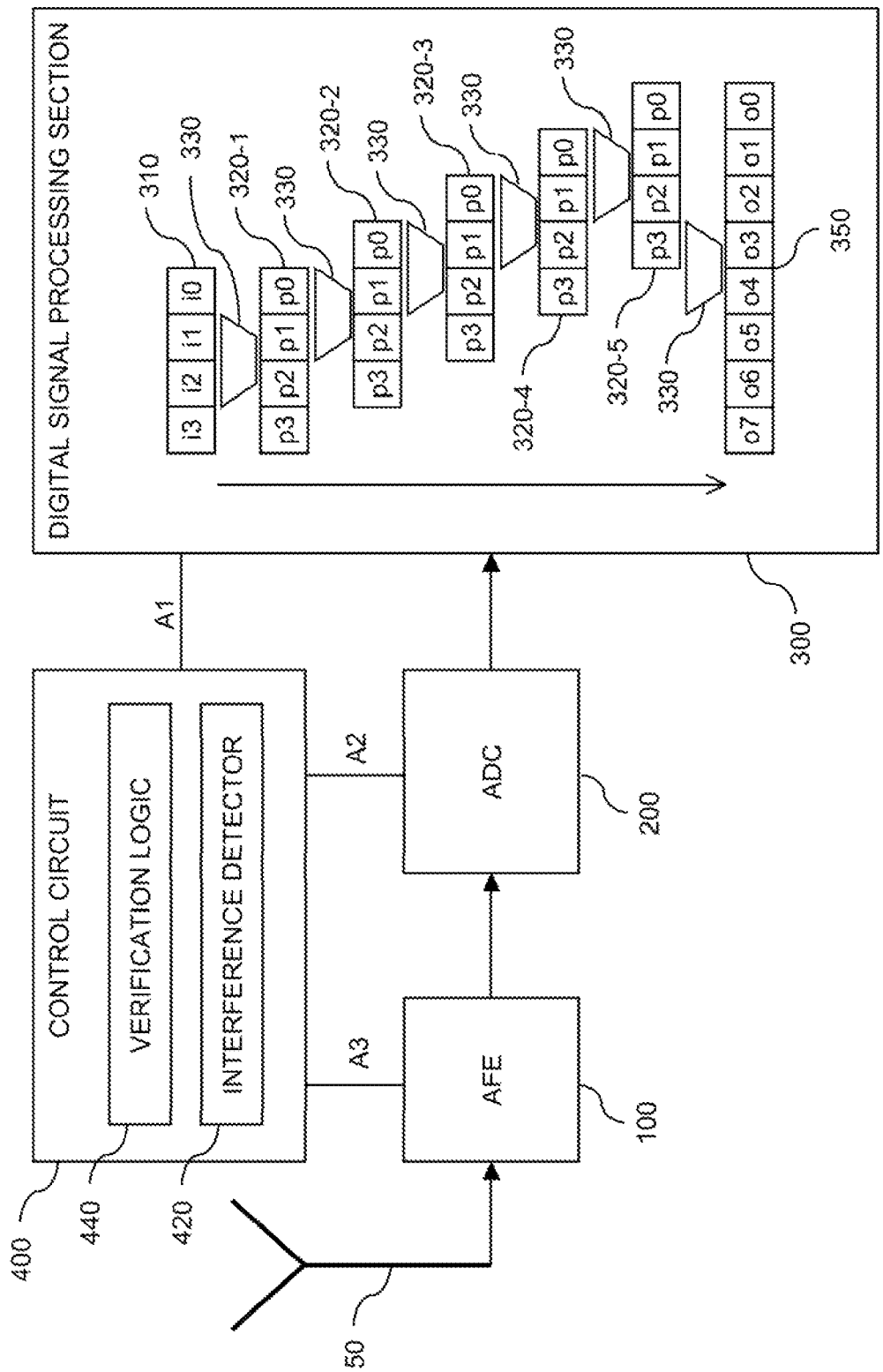
FIG. 1 schematically illustrates a circuit according to an embodiment of the invention.

In the following, some embodiments of the present invention will be described in more detail and with reference to the accompanying drawings. It is to be understood that the following description is given only for the purpose of illustration and is not to be taken in a limiting sense. The scope of the invention is not intended to be limited by the embodiments as described hereinafter, but is intended to be limited only by the appended claims.

Further, it is to be understood that in the following description of embodiments any direct connection or coupling between functional blocks, devices, components, circuit elements or other physical or functional units as described or shown in the drawings could also be implemented by an indirect connection or coupling, i.e. a connection or coupling comprising one or more intervening elements. Furthermore, it should be appreciated that functional blocks or units shown in the drawings may be implemented as separate circuits, but may also be fully or partially implemented in a common circuit. In other words, the description of various functional blocks is intended to give a clear understanding of various functions performed in a device and is not to be construed as indicating that these functional blocks have to be implemented as separate functional units. For example, one or more functional blocks may be implemented by programming a processor with suitably designed program code.

It should be noted that the drawings are provided to give an illustration of some aspects of embodiments of the present invention and therefore are to be regarded as schematic only. In particular, the elements as shown in the drawings are not necessarily to scale with each other, and the placement of various elements and drawings is chosen to provide a clear understanding of the respective embodiment and is not to be construed as necessarily being a representation of the actual relative location of the illustrated structures.

It is to be understood that the features of the various embodiments described herein may be combined with each other as appropriate. On the other hand, describing an embodiment with a plurality of features is not to be construed as indicating that all the described features are necessary for practicing the present invention. For example, other embodiments may comprise less features and/or alternative features.

In the following, embodiments of the invention will be described, which relate to adaptive digital processing of received signals, e.g. in a mobile communication device.

FIG. 1 schematically illustrates structures of a device according to an embodiment of the invention. More specifically, FIG. 1 illustrates receiver structures of the device. The device may be a mobile communication device, such as a mobile phone or the like. It is to be understood that the device may actually include further components, which have not been illustrated for the sake of clarity.

As illustrated, the device includes an antenna 50 for receiving radio signals, an analog front end (AFE) 100, an analog-to-digital converter (ADC) 200, a digital signal processing section 300, and a control device 400. The analog front end 100 is configured to accomplish analog processing of the radio signals, such as filtering, amplification, demodulation, or the like. The analog-to-digital converter 200 receives the processed signal from the analog front end and converts it into a multibit digital signal, which is then processed by the digital signal processing section 300. Accordingly, the device includes an analog receive section with the analog front end 100. The analog-to-digital converter 200 couples the analog receive section to the digital signal processing section 300. The digital signal processing section 300 may also be referred to as digital front end (DFE).

The digital signal processing section 300 receives the multibit digital signal from the analog-to-digital converter 200 and performs digital signal processing of the multibit digital signal, such as sample rate conversion or signal shaping, which may be accomplished by digital filters. For this purpose, the digital signal processing section is provided with multibit registers 310, 320-1, 320-2, 320-3, 320, 4, 320-5, 350. In the illustrated example, the multibit register 310 is an input register, the multibit registers 320-1, 320-2, 320-3, 320, 4, 320-5 are processing registers, e.g. for accomplishing addition operations and/or shift operations, and the multibit register 350 is an output register for holding the result of a processing operation. Each of the multibit registers includes a number of bit registers. In the input register 310, the bit registers are denoted by i0, i1, i2, i3. In the processing registers 320-1, 320-2, 320-3, 320, 4, 320-5, the bit registers are denoted by p0, p1, p2, p3. In the output register, the bit registers are denoted by o01, o1, o2, o3, o4, o5, o6, o7. As can be seen, different multibit registers may have different numbers of bit registers. The number of the bit registers defines a maximum bit width of the multibit register. In the illustrated example, the input register 310 has a maximum bit width of 4, the processing registers 320-1, 320-2, 320-3, 320, 4, 320-5 have a maximum bit width of 4, and the output register 350 has a maximum bit width of 8. However, it is to be understood that these values are merely exemplary and other implementations may use different maximum bit widths of individual multibit registers.

During processing, bit data in the multibit registers 310, 320-1, 320-2, 320-3, 320, 4, 320-5 is propagated to other multibit registers 320-1, 320-2, 320-3, 320, 4, 320-5, 350, which is indicated by the vertical arrow pointing from the input register 310 to the output register 350. In this process, the bit data may also be passed through combinatorial elements, such as logic gates, adding elements, or the like (not illustrated in FIG. 1).

In addition, FIG. 1 illustrates multiplexers 330 of the digital signal processing section. The multiplexers 330 are coupled to inputs of the multibit registers 320-1, 320-2, 320-3, 320, 4, 320-5, 350 or to inputs of combinatorial elements (not illustrated in FIG. 1). The multiplexers 330 may be used for adapting the digital processing section. The adaptation process will be described in more detail below.

The control circuit 400 is provided to control adaptation of the digital signal processing section 300. For this purpose, the control circuit 400 provides a first adaptation control signal to the digital signal processing section 300. In some embodiments, as illustrated in FIG. 1, the control circuit 400 may also provide a second adaptation control signal A2 to the analog-to-digital converter 200 to control adaptation of the analog-to-digital converter 200, and/or may also provide a third adaptation control signal A3 to the analog front end 100 to control adaptation of the analog front end 100.

According to an embodiment of the invention, the control circuit 400 controls adaptation of the digital signal processing section 300, and optionally also of the analog-to-digital converter 200 and/or of the analog front end 100, depending on detection of an interference scenario affecting the received signals. For this purpose, the control circuit is provided with an interference detector 420. For example, the interference detector may be configured to detect the interference scenario on the basis of monitoring signals from the analog front end 100, from the digital signal processing section 300, and/or from another source.

According to an embodiment of the invention, adaptation may be accomplished as follows: If the interference detector 420 detects interference affecting the received signal, the first adaptation control signal A1 is generated to adapt the digital signal processing section 300 to increase its signal processing performance. Optionally, also the second adaptation control signal A2 may be generated to increase the performance of the analog-to-digital converter 200, and/or the third adaptation control signal A3 may be generated to increase the performance of the analog front end 100. In this way, the receiver structure may be adapted to allow successful signal reception even in the presence of the interference. On the other hand, if the interference detector 420 detects no interference affecting the received signal, the first adaptation control signal A1 is generated to adapt the digital signal processing section 300 to decrease its signal processing performance, i.e. to bring the signal processing section 300 into a low performance mode. Optionally, also the second adaptation control signal A2 may be generated to decrease the performance of the analog-to-digital converter 200, i.e. to bring the analog-to-digital converter 200 into a low performance mode, and/or the third adaptation control signal A3 may be generated to decrease the performance of the analog front end 100, i.e. to bring the analog front end 100 into a low performance mode. In this way, power consumption may be lowered without adversely affecting signal reception.

According to an embodiment of the invention, the adaptation is accomplished by changing bit widths. More specifically, a low performance mode of the analog-to-digital converter 200 may then be implemented by reducing the bit width of the multibit signal generated by the analog-to-digital converter 200, and the low performance mode of the digital signal processing section 300 may be implemented by reconfiguration to operation on the basis of smaller multibit registers, which are obtained by leaving some of the bit registers of the existing multibit registers 310, 320-1, 320-2, 320-3, 320, 4, 320-5, 350 unused. The bit width defined by the number of bit registers of a multibit register which are actually used will in the following also be referred to as effective bit width of the multibit register. The low performance mode of the digital signal processing section 300 may additionally use clock gating of unused bit registers of the multibit registers 310, 320-1, 320-2, 320-3, 320, 4, 320-5, 350. This may be accomplished by a clock gating circuit of the digital signal processing section 300 (not illustrated in FIG. 1).

According to an embodiment, as illustrated in FIG. 1, the control circuit 400 may optionally also include a verification logic 440. The verification logic 440 may be used to verify stability of a linear time invariant system formed by the multibit registers 310, 320-1, 320-2, 320-3, 320, 4, 320-5, 350. In this way, it can be avoided that instabilities due to the adaptation of the digital signal processing section 300 adversely affect the performance of the system. For example, the verification logic 440 may monitor state variables of the linear time invariant system.

The control circuit 400 may be implemented by dedicated hardware. Alternatively, at least a part of the control circuit 400 could be implemented by software to be executed by a processor, e.g. by firmware of a receiver chip.

The multiplexers 330 of the digital signal processing section 300 may be used in the adaptation process to reconfigure connections to and between the multibit registers 310, 320-1, 320-2, 320-3, 320, 4, 320-5, 350. For example, the multiplexers 330 may be used to set an input of a certain bit register or an input of a combinatorial element to a predefined state, e.g. to zero. In this way, unnecessary signal transitions, e.g. in unused branches of the digital signal processing section 300, can be avoided, thereby reducing power consumption. For example, inputs of a combinatorial element receiving its inputs from an unused bit register, can be set to a predefined state. Also, any bit register which in the low performance mode is not affected by the content of the input register 310, i.e. is always zero or is always one, can be fixedly set to this state while in the low performance mode.

The above-described adaptation allows for significant power saving in the low performance mode. For example, if the effective bit width of all multibit registers in the digital signal processing section 300 is reduced by 50%, also about 50% reduction of power consumption can be obtained. Also, the adaptation can typically be accomplished during runtime of the digital signal processing section 300 without adversely affecting the operation of the overall receiver structure.

Figure 2:
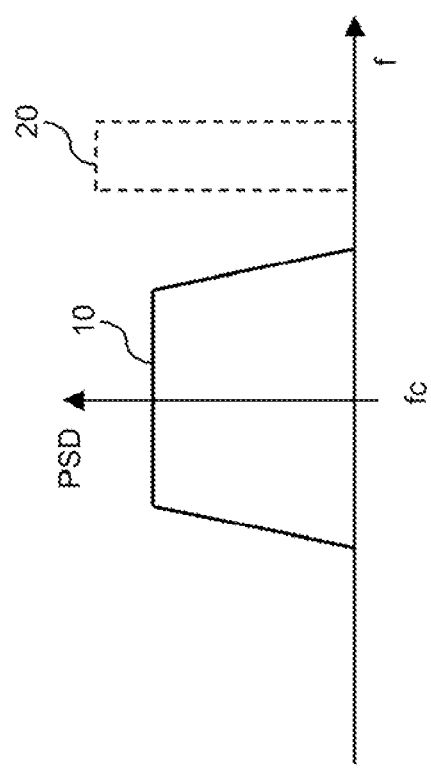
FIG. 2 schematically illustrates possible interference scenarios.

FIG. 2 further illustrates possible interference scenarios. More specifically, FIG. 2 schematically shows a power spectral density (PSD) of a communication signal 10. The communication signal 10 is located in a given frequency range, also referred to as channel bandwidth. In addition, an interferer 20 is schematically shown. In the illustrated example, the interferer 20 is located outside the channel bandwidth, but may still affect reception of the communication signal 10. The ability of a receiver to receive the communication signal 10 irrespective in the presence of the interferer is sometimes also referred to as blocking capability. Typically, a good blocking capability also requires high performance receiver structures, e.g. high dynamic range digital processing. The above concepts make use of that, in the absence of the interferer 20, the blocking capability is no longer critical and signal processing using lower dynamic range is sufficient to successfully receive the communication signal 10. In the absence of the interferer 20, it is therefore possible to save power by adapting the digital signal processing, e.g. by reducing bit widths.

In the following, the adaptation of effective bit widths of multibit registers will be further explained by referring to particular examples of digital signal processing operations, which may be implemented by the multibit registers, e.g. the multibit registers 310, 320-1, 320-2, 320-3, 320, 4, 320-5, 350 of the digital signal processing section 300 of FIG. 1.

Figure 3:
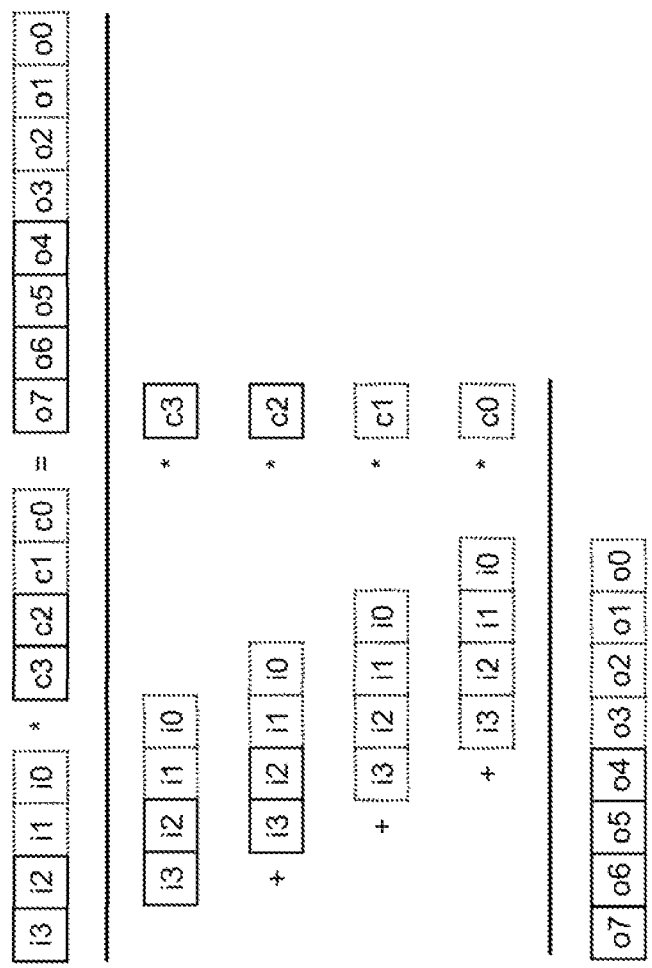
FIG. 3 schematically illustrates processing operations by means of multibit registers as used in an embodiment of the invention.

FIG. 3 shows an example of a multiplication implemented by addition operations and shift operations on multibit registers. In FIG. 3, bit registers of an input register are denoted by $i0, i1, i2, i3$, and bit registers of an output register are denoted by $o0, o1, o2, o3, o4, o5$. Bit registers used to store bits of a multiplication coefficient are denoted by $c0, c1, c2, c3$. In terms of mathematical equations relating to individual bit multiplications, the multiplication operation of FIG. 3 can be expressed as:

$$o0 = i0*c0$$

$$o1 = i1*c0 + i0*c1 + \text{carry}\_0$$

$$o2 = i2*c0 + i1*c1 + i0*c2 + \text{carry}\_1$$

$$o3 = i3*c0 + i2*c1 + i1*c2 + i0*c3 + \text{carry}\_2$$

$$o4 = i3*c1 + i2*c2 + i1*c3 + \text{carry}\_3$$

$$o5 = i3*c2 + i2*c3 + \text{carry}\_4$$

$$o6 = i3*c3 + \text{carry}\_5$$

$$o7 = \text{carry}\_6 \tag{1}$$

Here, the designation "carry" refers to the carry bit of the previous operation, i.e. carry_0 is the carry bit from the calculation of $o0$, carry_1 is the carry bit from the calculation of $o1$, carry_2 is the carry bit from the calculation of $o2$, carry_3 is the carry bit from the calculation of $o3$, carry_4 is the carry bit from the calculation of $o4$, carry_5 is the carry bit from the calculation of $o5$, and carry_6 is the carry bit from the calculation of $o6$. The bit multiplications can be implemented in hardware by adding the values of the input bit register if the value of the coefficient bit register is one, and not adding the value of the input bit register if the value of the coefficient bit register is zero. The carry bit is set if the result of the addition exceeds one.

In FIG. 3, the configuration in the low performance mode is illustrated by showing unused bit registers in dotted lines. As can be seen, in the low performance mode half of the bit registers are unused and may be disabled by clock gating. Also, a number of calculations can be omitted. The corresponding mathematical equations would be:

$$o4 = i2*c2$$

$$o5 = i3*c2 + i2*c3$$

$$o6 = i3*c3 + \text{carry}\_5$$

$$o7 = \text{carry}\_6 \tag{2}$$

Figure 4:
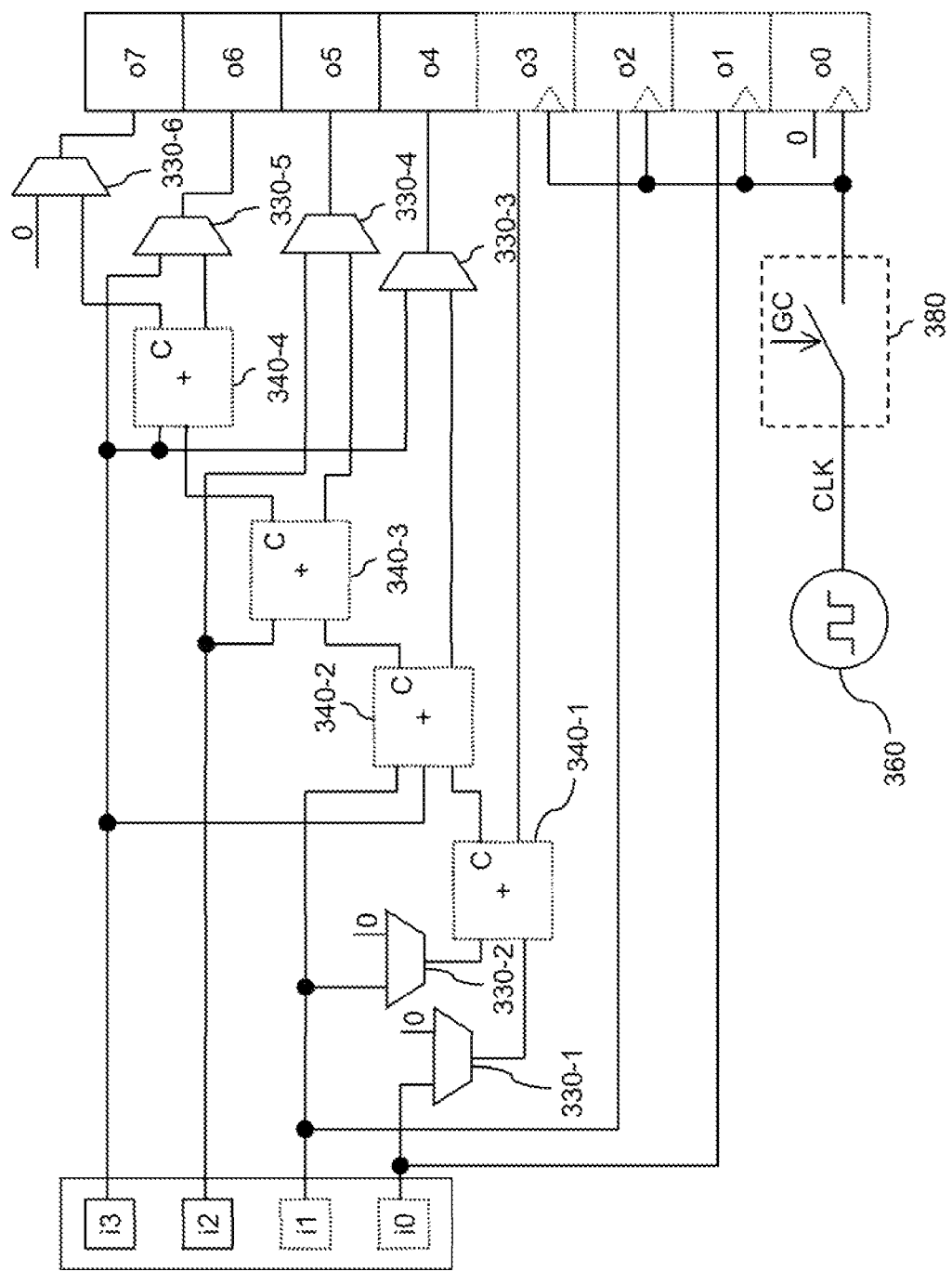
FIG. 4 schematically illustrates a processing circuit for implementing an example of adaptive digital processing according to an embodiment of the invention.

FIG. 4 shows a circuit implementation of the above multiplication for exemplary values of the coefficient bit registers, which are $c0=c2=0$ and $c1=c3=1$. Again, elements which are unused in the low performance mode are shown by dotted lines. The mathematical equations (1), which correspond to the full bit width, can then be written as:

$$o0 = 0$$

$$o1 = i0$$

$$o2 = i1$$

$$o3 = i2 + i0$$

$$o4 = i3 + i1 + \text{carry}\_3$$

$$o5 = i2 + \text{carry}\_4$$

$$o6 = i3 + \text{carry}\_5$$

$$o7 = \text{carry}\_6 \tag{3}$$

and the mathematical equations (2), which correspond to the low performance mode, can be written as:

$$o4 = i3$$

$$o5 = i2$$

$$o6 = i3$$

$$o7 = 0 \tag{4}$$

In the circuit implementation of FIG. 4, these calculations are implemented by combinatorial elements in the form of adding elements 340-1, 340-2, 340-3, 340-4. Each adding element 340-1, 340-2, 340-3, 340-4 has a number of inputs and an output at which the result of adding the values at the inputs is available. Further, each adding element 340-1, 340-2, 340-3, 340-4 has a carry bit output, designated by C. The adding element 340-1 receives the value of the input bit register i0 via a multiplexer 330-1 and the value of the input register i1 via a multiplexer 330-2. The adding element 340-2 receives the value of the input bit registers i1 and i3, and the value of the carry bit output of the adding element 340-1. The adding element 340-3 receives the value of the input bit register i2 and the value of the carry bit output of the adding element 340-2. The adding element 340-4 receives the value of the input bit register i3 and the value of the carry bit output of the adding element 340-3.

As further illustrated in FIG. 4, the output bit register o0 receives a fixedly set input value of zero. The output bit register o1 receives the value of the input bit register i0. The output bit register o2 receives the value of the input bit register i1. The output bit register o3 receives the output of the adding element 340-1. The output bit register o4 receives the output of the adding element 340-2 via a multiplexer 330-3. The output bit register o5 receives the output of the adding element 340-3 via a multiplexer 330-4. The output bit register o6 receives the output of the adding element 340-4 via a multiplexer 330-5. The output bit register o7 receives the value of the carry bit output of the adding element 340-4 via a multiplexer 330-6.

The multiplexers 330-3, 330-4, 330-5, 330-6 can be used to accomplish a reconfiguration from the full bit width according to the mathematical equations (3) to the low performance mode according to the mathematical equations (4). For this purpose, the multiplexer 330-3 is controlled to supply not the output of the adding element 340-2, but rather the value of the input bit register i3 to the output bit register o4. Further, the multiplexer 330-4 is controlled to supply not the output of the adding element 340-3, but the value of the input bit register i2 to the output bit register o5. In addition, the multiplexer 330-5 is controlled to supply not the output of the adding element 340-4, but the value of the input bit register i3 to the output bit register o6. Finally, the multiplexer 330-6 is controlled to supply not the value of the carry bit output of the adding element 340-4, but a fixed value of zero to the output bit register o7.

In addition, the multiplexers 330-1 and 330-2 may be used to disable combinatorial branches which are unused in the low performance mode. In particular, as can be seen from the mathematical equations (4), the adding element 340-1 receives inputs from the unused input bit registers i0 and i1. Accordingly, unnecessary signal transitions in the adding element 340-1 and signals derived from its outputs can be avoided by setting its inputs to predefined values, e.g. to zero. For this purpose, the multiplexer 330-1 is controlled to supply not the value of the unused input bit register i0, but rather a fixed value of zero to the adding element 340-1. Further, the multiplexer 330-2 is controlled to supply not the value of the unused input bit register i1, but rather a fixed value of zero to the adding element 340-1.

In the low performance mode, the input bit registers i0 and i1 and the output bit registers o0, o1, o2, o3, and o4 are unused and may be disabled by clock gating. FIG. 4 also shows a corresponding clock gating circuit 380 for clock gating the output bit registers o0, o1, o2, o3, and o4. As illustrated, the clock gating circuit 380 includes a switch coupled between a clock signal source 360 and clock inputs of the output bit registers o0, o1, o2, o3, and o4. The clock signal source 360 supplies a clock signal CLK to the clock inputs of the output bit registers o0, o1, o2, o3, and o4. By means of a gating control signal GC the switch of the clock gating circuit 380 can be opened, thereby decoupling the output bit registers o0, o1, o2, o3, and o4 from the clock signal source 380. It is to be understood that a similar clock gating circuit could also be provided for the input bit registers i0 an i1.

The above control operations, e.g. controlling the multiplexers 330-1, 330-2, 330-3, 330-4, 330-5, 330-6 can be accomplished on the basis of the first adaptation signal A1 as described in connection with FIG. 1. In other words, control signals of the multiplexers 330-1, 330-2, 330-3, 330-4, 330-5, 330-6 and the gating control signal GC may be part of the first adaptation control signal.

As can be seen, the low performance mode using a reduced efficient bit width of multibit registers can provide significant power saving. This applies not only for simple calculations as explained in connection with FIGS. 3 and 4, but also to more complex types of digital signal processing.

Figure 5:
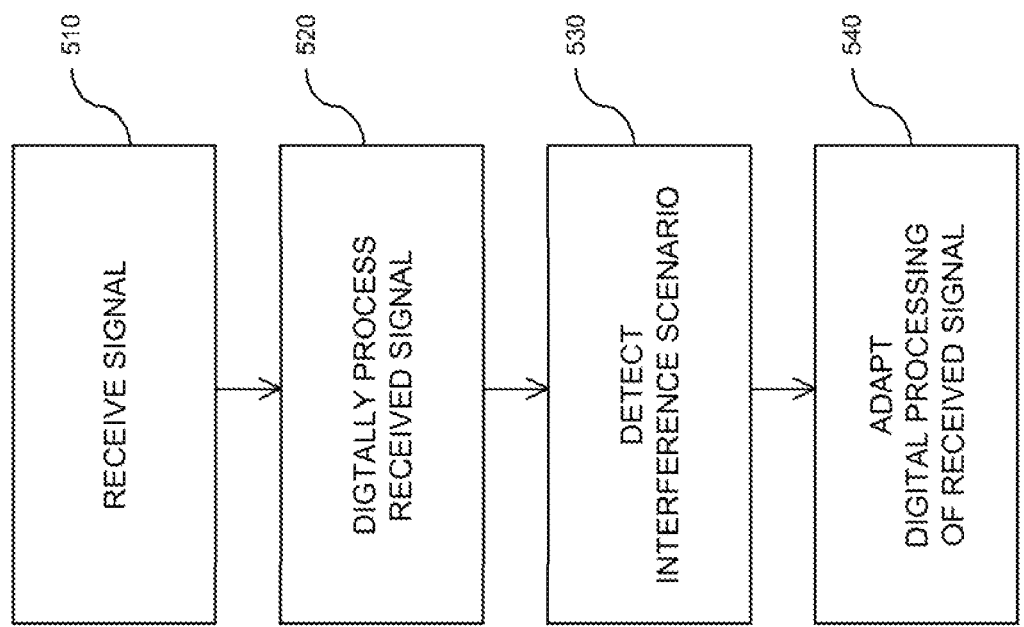
FIG. 5 shows a flowchart for illustrating a method according to an embodiment of the invention.

FIG. 5 shows a flowchart for illustrating a method according to an embodiment of the invention. The method may be used to implement the above-described adaptation processes.

At step 510, a signal is received, e.g. using an antenna and/or analog front end as explained in connection with FIG. 1. The signal may be a radio signal on a wireless receive channel.

At step 520, the received signal is digitally processed, e.g. using the digital signal processing section 300 as explained in connection with FIG. 1. Before being subjected to digital signal processing, the received signal may be converted to a digital signal, e.g. by means the digital-to-analog converter 200 as explained in connection with FIG. 1. The digital signal processing may be accomplished by means of multibit registers. Further, also combinatorial elements such as adding elements or logic gates may be used. The digital signal processing may involve performing addition operations or shift operations on the multibit registers.

At step 530, an interference scenario affecting is detected, e.g. by means of the interference detector 420 as explained in connection with FIG. 1. The interference scenario may be presence or absence of an interferer outside a communication channel bandwidth of the received signal, e.g. as explained in connection with FIG. 2.

At step 540, the digital signal processing is adapted depending on the detected interference scenario. For example, if the interference scenario is presence of an interferer affecting the reception of the signal, the digital signal processing may be adapted to provide a high performance. In this way good blocking capabilities may be obtained and the signal can be successfully received even in the presence of the interferer. On the other hand, if the interference scenario is absence of an interferer affecting the reception of the signal, the digital signal processing may be accomplished in a low performance mode. In this way, power consumption of a receiver may be reduced. The adaptation process may involve adapting an efficient bit width of at least one multibit registers used in the digital signal processing. In this case, unused bit registers of the at least one multibit register may be disabled by clock gating.

It is to be understood that the method steps of FIG. 5 may be performed in the illustrated order or in a different order. For example, detection of step 530 and/or the adaptation of step 540 could be performed before the signal processing of step 520.

It is to be understood that the above-described embodiments serve only as examples for implementations of concepts according to the present invention, and that these concepts may be applied in various manners which are not restricted to the described embodiments. For example, the concepts may be applied not only in wireless receivers, but also in wire-based receivers. Further, the concepts may be applied to various types of digital signal processing, among which the illustrated processing using addition operations and shift operations is merely one example. Furthermore, the concepts could be combined with various other power saving mechanisms.

The invention claimed is:

1. A receiver, comprising:
    an interference detector to detect an interference scenario affecting reception of a signal by the receiver;
    a digital signal processing circuit to process the signal;
    a gating circuit configured to decouple unused bit registers of the at least one multibit register from a clock signal; and
    a control circuit, the control circuit being configured to adapt the digital signal processing circuit depending on the interference scenario detected by the interference detector,
    wherein the digital signal processing circuit comprises at least one multibit register, and
    wherein the control circuit is configured to adapt an effective bit width of the at least one multibit register.

2. The receiver according to claim 1,
    wherein the at least one multibit register is a processing register configured to perform addition operations and/or shift operations.

3. The receiver according to claim 1,
    wherein the at least one multibit register is an output register configured to hold a processing result.

4. A device, comprising:
    an analog receive section configured to receive a signal;
    a multibit analog-to-digital-converter configured to convert the received signal to a multibit digital signal;
    a digital signal processing section configured to process the multibit digital signal;
    a gating circuit configured to decouple unused bit registers of the at least one multibit register from a clock signal;

an interference detector configured to detect an interference scenario affecting the reception of the signal; and a control circuit configured to adapt, depending on the detected interference scenario, a bit width of the multibit digital signal generated by the analog-to-digital converter and an effective bit width of at least one multibit register in the digital signal processing section.

5. The device according to claim 4,
wherein the at least one multibit register is a processing register configured to perform addition operations and/or shift operations.

6. The device according to claim 4,
wherein the at least one multibit register is an output register configured to hold a processing result.

7. The device according to claim 4, comprising:
a multiplexer coupled to at least one input of the at least one multibit register or to at least one input of a combinatorial element of the digital signal processing section.

8. The device according to claim 4,
wherein the signal is a radio signal.

9. A method, comprising:
receiving a signal;
converting the received signal to a digital multibit signal;
digitally processing the received signal;
detecting an interference scenario affecting said receiving of the signal;
processing the digital multibit signal by means of at least one multibit register;
clock gating of unused bit registers of the at least one multibit register;
adapting an effective bit width of the at least one multibit register depending on the detected interference scenario; and
adapting the digital processing of the received signal depending on the detected interference scenario.

10. The method according to claim 9, comprising:
performing a shift operation on the at least one multibit register.

11. The method according to claim 9, comprising:
performing an addition operation on the at least one multibit register.

12. An apparatus, comprising:
an interference detector to detect an interference scenario affecting reception of an analog signal;
a digital signal processing circuit to process the signal, the digital signal processing circuit includes at least one multibit register having decoupleable unused bit registers; and
a control circuit, the control circuit configured to adapt the digital signal processing circuit depending on the interference scenario detected by the interference detector, the interference scenario associated at least with the analog signal.

13. The apparatus according to claim 12, wherein the unused bit registers are decoupleable from a clock signal.

* * * * *